United States Patent
Zander

(10) Patent No.: US 12,355,309 B2
(45) Date of Patent: Jul. 8, 2025

(54) DRIVE UNIT WITH A CONTROL DEVICE

(71) Applicant: Edscha Engineering GmbH, Remscheid (DE)

(72) Inventor: Marc Zander, Remscheid (DE)

(73) Assignee: Edscha Engineering GmbH

( * ) Notice: Subject to any disclaimer, the term of this patent is extended or adjusted under 35 U.S.C. 154(b) by 238 days.

(21) Appl. No.: 17/884,503

(22) Filed: Aug. 9, 2022

(65) Prior Publication Data
US 2023/0062450 A1    Mar. 2, 2023

(51) Int. Cl.
*H02K 11/00* (2016.01)
*E05F 15/60* (2015.01)
*H02K 11/33* (2016.01)
*H02K 41/02* (2006.01)

(52) U.S. Cl.
CPC ......... *H02K 11/0094* (2013.01); *H02K 11/33* (2016.01); *E05F 15/60* (2015.01); *H02K 41/02* (2013.01)

(58) Field of Classification Search
CPC .... H02K 11/0094; H02K 11/33; H02K 41/02; E05F 15/60
See application file for complete search history.

(56) References Cited

U.S. PATENT DOCUMENTS

| | | |
|---|---|---|
| 2005/0212475 A1 | 9/2005 | Kakutani et al. |
| 2017/0291635 A1* | 10/2017 | Yamasaki ............ H02K 5/225 |
| 2017/0294860 A1 | 10/2017 | Yamasaki |
| 2018/0083510 A1 | 3/2018 | Purohit et al. |
| 2018/0084646 A1 | 3/2018 | Purohit et al. |
| 2019/0323473 A1 | 10/2019 | Namuduri et al. |
| 2020/0042032 A1* | 2/2020 | Zhang ............... H04L 12/40013 |
| 2021/0091639 A1 | 3/2021 | Purohit et al. |

FOREIGN PATENT DOCUMENTS

| | | |
|---|---|---|
| DE | 102005059051 A1 | 6/2007 |
| DE | 202006020411 U1 | 6/2008 |
| DE | 102017205917 A1 | 10/2017 |
| DE | 102019130651 A1 | 5/2021 |
| DE | 102020208631 A1 | 1/2022 |
| EP | 3297140 A1 | 3/2018 |

\* cited by examiner

*Primary Examiner* — Jue Zhang
(74) *Attorney, Agent, or Firm* — Davidson Kappel LLC

(57) ABSTRACT

A drive unit, in particular for a vehicle flap drive, includes a housing (3), a motor (2) arranged in the housing, a control device (11) configured for control of the motor (2), comprising a first printed circuit board (12) having a top side (12*a*) and a underside (12*b*), and a second printed circuit board (13) having a top side (13*a*) and an underside (13*b*), wherein the first printed circuit board (12) is arranged above the motor (2), and the second printed circuit board (13) is arranged above the first printed circuit board (12). The drive unit further comprises a power unit (19) arranged on the first printed circuit board (12), comprising at least one first filter (20) and a Hall sensor (21) and a control unit (23) arranged on the second printed circuit board (13), the control unit (23) comprising at least one microcontroller (24) and a voltage regulator (26). At least one polarity reverse protection device (29) is arranged on the underside (12*b*) of the first printed circuit board (12).

19 Claims, 3 Drawing Sheets

DRIVE UNIT WITH A CONTROL DEVICE

The present disclosure relates to a drive unit, in particular for a vehicle flap drive, comprising a housing, a motor and a control device.

BACKGROUND

Drive units that are used in linear drives, for example for the driven pivoting of vehicle flaps, in particular tailgates or vehicle doors, are known from practice. Usually, the drive units used in the linear drives are, due to the electrical systems already present in the vehicle, designed as electric motors, which are supplied with current from the outside by corresponding electrical supply lines in the vehicle and are optionally connected to control lines for controlling the electric motor. Such drive devices thereby often comprise an external printed circuit board, which comprises a control device or a control unit and which is arranged outside the drive unit. A disadvantage of the connection of the controller and the linking to the external power supply are long cable guides, which correspondingly disadvantageously take up installation space in the vehicle.

DE 10 2005 059 051 A1 shows a drive unit for a pivotable vehicle flap, wherein the drive unit comprises a housing and a motor is arranged in the housing. A motor controller is arranged on a top side of the housing, wherein the motor controller comprises three printed circuit boards arranged one above the other in a so-called sandwich construction, on which various components are arranged on the top side and/or the underside of the respective printed circuit board. Hall sensors for monitoring the operating state of the motor and interference suppression filter are arranged on a first printed circuit board arranged adjacent to the top side of the housing. Microcontrollers, voltage regulators, a CAN interface, and similar components are arranged on a second printed circuit board arranged above the first printed circuit board. An H-bridge and a polarity reverse protection device and/or further filters with regard to electromagnetic interference are arranged on a third printed circuit board arranged above the second printed circuit board. A disadvantage of the drive unit is that three printed circuit boards stacked one on top of the other have to be used, wherein the residual construction length of the drive unit is accordingly disadvantageously limited downwards. In addition the production costs of the drive unit are thus increased.

US 2005/0 212 475 A1 shows a drive unit comprising a housing, an electric motor arranged in the housing, and a control device configured for controlling the motor, wherein the control device comprises a first printed circuit board having a top side and an underside, and a second printed circuit board having a top side and an underside. Thereby, the first printed circuit board is arranged above the motor, and the second printed circuit board is arranged above the first printed circuit board. A power unit is arranged on the underside of the first printed circuit board, wherein a Hall sensor is arranged on the top side of the first printed circuit board.

DE 20 2006 020 411 U1 discloses a device for electrical contacting and at least one first and one second printed circuit board, each equipped with electronic components and arranged in a housing, wherein the first printed circuit board is arranged above the second printed circuit board.

DE 10 2020 208 631 A1 shows an electronics unit for an electrical device such as an electrically-driven insert tool, wherein the electronics unit comprises a first printed circuit board with a top side and an underside, and a second printed circuit board comprises a top side and an underside, wherein the second printed circuit board is arranged above the first printed circuit board. The first printed circuit board is designed as a power board, and the second printed circuit board is designed as a control board. Microprocessors and further integrated circuits are arranged on the second printed circuit board.

DE 10 2019 130 651 A1 shows a drive unit for driving a vehicle flap, comprising a telescopic housing, a motor arranged in the housing, and a control device configured to control the motor and designed as a motor circuit board. The motor circuit board is arranged above the motor. The motor circuit board and the motor are connected both to one another and to the on-board electrical system of the vehicle via electrical connections and a cable harness.

DE 10 2017 205 917 A1 shows a control device for a power steering device, wherein the power steering device comprises a motor arranged in a housing. The control device comprises a first printed circuit board with a top side and an underside, and a second printed circuit board with a top side and an underside, wherein the second printed circuit board is arranged above the first printed circuit board. A first filter, formed by an inductor and a capacitor, and a Hall sensor are arranged on the first printed circuit board, and a control unit is arranged on the second printed circuit board, which control unit comprises a microcontroller and a voltage regulator. Furthermore, a polarity reverse protection relay is arranged on the first printed circuit board.

SUMMARY

It is an aim of the present disclosure to provide a drive unit with a control device that is designed in a space-saving and simple manner.

A drive unit, in particular for a vehicle flap drive is provided, comprising a housing, a motor arranged in the housing, a control device, configured for controlling the motor, comprising a first printed circuit board having a top side and an underside, and a second printed circuit board having a top side and an underside, wherein the first printed circuit board is arranged above the motor, and the second printed circuit board is arranged above the first printed circuit board. The drive unit further comprises a power unit arranged on the first printed circuit board, wherein the power unit comprises at least one first filter and a Hall sensor. In addition, the drive unit comprises a control unit, arranged on the second printed circuit board, comprising at least one microcontroller and a voltage regulator. At least one polarity reverse protection device is arranged on the first printed circuit board. This advantageously makes it possible for the power unit and the control unit or the control device to be arranged compactly on the drive unit, and thus for the drive unit to be constructed in a particularly space-saving and simple manner. In particular, better utilization of the space present on the two printed circuit boards is achieved, so that the functions of both a power unit and a control unit known from the prior art are realized only by two instead of three printed circuit boards.

In a preferred embodiment, it is provided that the polarity reverse protection device is arranged on the underside of the first printed circuit board. Advantageously, the space present on the first printed circuit board is better utilized, so that the power unit as a whole is designed in a space-saving manner. In addition, it is advantageously achieved that the components arranged on the first printed circuit board are spaced farther apart from one another, and thus a mutual influence of these is reduced.

In an advantageous further development, the control unit comprises a vehicle-bus transceiver. The communication between the control unit which is arranged on the second printed circuit board and, possibly, further control devices outside the drive unit that are present in the vehicle, is advantageously made possible. In a preferred further development, it is provided that the microcontroller, the vehicle-bus transceiver, and the voltage regulator are arranged on the top side of the second printed circuit board. It is thereby advantageously achieved that the sensitive components of the control unit are further away from the first printed circuit board or the power unit present on it.

The first printed circuit board is expediently connected to the second printed circuit board via a plug connector. The plug connector preferably comprises a contact pin strip and a contact socket. In a particularly preferred embodiment, the contact pin strip is arranged on the top side of the first printed circuit board and the contact socket is arranged on the underside of the second printed circuit board. In an alternative embodiment the contact pin strip is arranged on the underside of the second printed circuit board and the contact socket is arranged on the top side of the first printed circuit board. Advantageously, an electrical connection between the first printed circuit board and the second printed circuit board is established particularly easily and reliably by plugging together the contact pin strip and the contact socket. Further advantageously, no additional cables for electrically connecting the first printed circuit board and the second printed circuit board are required. Furthermore, the plug connector also functions as a spacer for the first printed circuit board and the second printed circuit board at the same time due to its mechanical robustness compared to cables. Advantageously, no further components are necessary, in particular on the top side of the first printed circuit board or the underside of the second printed circuit board, so that the space available on the printed circuit boards is utilized more efficiently.

A motor driver is preferably arranged on the first printed circuit board. The motor driver is connected on the input side to the microcontroller and on the output side to the motor, so that the power commands provided by the microcontroller are converted into the corresponding current intensities and voltages for driving the motor.

In a particularly preferred embodiment, the second printed circuit board has, in an edge region, a first recess and a second recess for the passage of a pair of power supply cables. The power supply cables are expediently connected to the first printed circuit board or to the power unit arranged on the first printed circuit board. In an expedient further development, the second printed circuit board further has, in an edge region, at least one third recess for the passage of a pair of control line cables.

It is advantageously achieved by the first recess, the second recess and the third recess that the power supply cables or control line cables can be laid in a space-saving manner and in particular in the radial direction do not require space beyond the total circumference of the second printed circuit board. Further advantageously, an additionally shielding control housing can optionally be arranged above the control device, wherein the control housing has corresponding recesses on a top side for the passage of the pairs of power supply cables or control line cables.

Particularly preferably the first printed circuit board has two first round holes which are provided for electrical connection to the pair of power supply cables. Furthermore, the first printed circuit board has two second round holes which are provided for electrical connection to the pair of control line cables. Advantageously the two second round holes are arranged between the two first round holes. Advantageously a symmetrical structure for a cable harness comprising the power supply cables and control line cables can thus be selected, which is advantageous regarding the clear arrangement of the cable to be connected as well. Particularly preferably the first round holes are each arranged below the first recess and the second recess. Further preferably the two second round holes are arranged below the third recess. Advantageously, the power supply cables and the control line cables can be guided past the second printed circuit board without bending and can be inserted into the round holes.

In an advantageous further development the Hall sensor or at least one measuring probe of the Hall sensor is arranged on the underside of the first printed circuit board. In an expedient embodiment of the drive unit a ring magnet is arranged above the housing, wherein the ring magnet can be driven rotatably via a drive shaft coupled to the motor. Expediently the ring magnet is connected to the drive shaft in a rotationally-fixed manner. Advantageously, a rotational speed measurement of the motor is thereby made possible in a particularly compact manner.

Expediently the housing comprises at an upper end a cover element that seals the housing upwards. Advantageously the motor arranged in the housing is thus protected from moisture and the penetration of dirt. Particularly preferably the drive unit further comprises a connection device for electrically connecting the control device to the motor. In an advantageous embodiment the connection device is arranged at an upper end of the housing. The connecting device is preferably arranged in the region of the cover element. The connecting device expediently positions the control device via the motor or the housing in such a manner that the control device is aligned concentrically to a drive shaft of the motor or a drive axle of the drive unit.

In a preferred embodiment the connection device comprises a first contact pin, a second contact pin and a third contact pin. The contact pins expediently pass through the cover element at the upper end of the housing. Advantageously, the contact pins have on their upper ends facing the first printed circuit board tapered contact sections that adjoin underlying, wider center sections. In an expedient further development the first printed circuit board has contact bores that match the contact sections and into which the contact pins of the connection device can be inserted.

The contact pins advantageously have, in the contact section, a cross-section matching the respective contact bores, wherein the cross-section in the center sections of the contact pins has a larger area than the contact bores, so that the first printed circuit board is mechanically supported on the center sections of the contact pins.

Advantageously the first printed circuit board or the control device is not only electrically connected to the motor via the connecting device but also defines a fixed distance between the first printed circuit board and the motor, in particular the distance between the first printed circuit board and the ring magnet arranged between the motor and the first printed circuit board through the aforementioned design of the contact pins. This in particular ensures that the Hall sensor arranged on the first printed circuit board is positioned at a defined, optimal distance from the ring magnet, so that good measurement accuracy is achieved for the measurement of the motor rotational speed.

BRIEF SUMMARY OF THE DRAWINGS

The present disclosure is explained in more detail below with reference to the accompanying drawings using a preferred exemplary embodiment.

DETAILED DESCRIPTION

Figure 1:
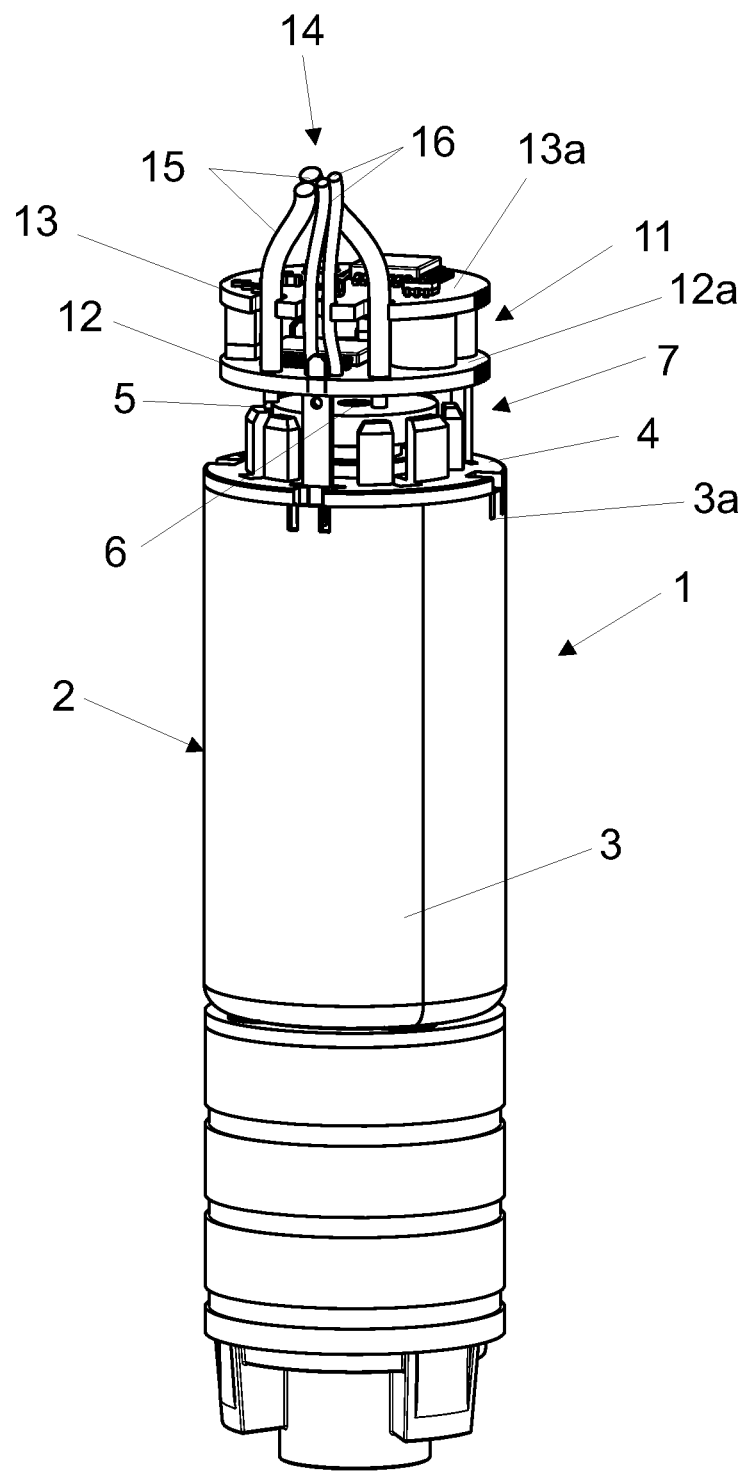
FIG. 1 shows a preferred exemplary embodiment of a drive unit in a perspectival view.

FIG. 1 shows a perspective view of a preferred exemplary embodiment of a drive unit 1 according to the present disclosure. The drive unit 1 comprises a motor 2 designed as an electric motor and a housing 3 in which the motor 2 is accommodated. A cover element 4 is arranged at an upper end 3*a* of the housing 3, so that the motor 2 arranged in the housing 3 is protected from the penetration of moisture and dirt. For this purpose, the cover element 4 is pressed into the open upper end 3*a* of the hollow cylindrical housing 3. A ring magnet 5 is arranged above the cover element 4 and can be set in rotation via a drive shaft 6, coupled to the motor 2, which is connected to the ring magnet 5 in a rotationally-fixed manner.

A control device 11 is fixedly arranged via the cover element 4 or the motor 2 by means of a connection device 7, wherein the control device 11 comprises a first printed circuit board 12 with a top side 12*a* and a second printed circuit board 13 with a top side 13*a*. The connection device 7 serves for the electrical connection of the control device 11 to the motor 2, so that control signals or currents and voltages required for controlling the motor 2 can be forwarded to the motor 2. In addition, the connection device 7 advantageously positions the control device 11 in such a manner above the motor 2 or the housing 3 that the control device 11 is oriented concentrically to the drive shaft 6 of the motor 2.

The control device 11 is connected to the vehicle via a cable harness 14, wherein both the primary power supply and the forwarding of control signals to the control device 11 are carried out via the cable harness 14. For this purpose, the cable harness 14 comprises both a pair of power supply cables 15 and a pair of control line cables 16. The cable harness 14 is electrically connected to the first printed circuit board 12.

Figure 2:
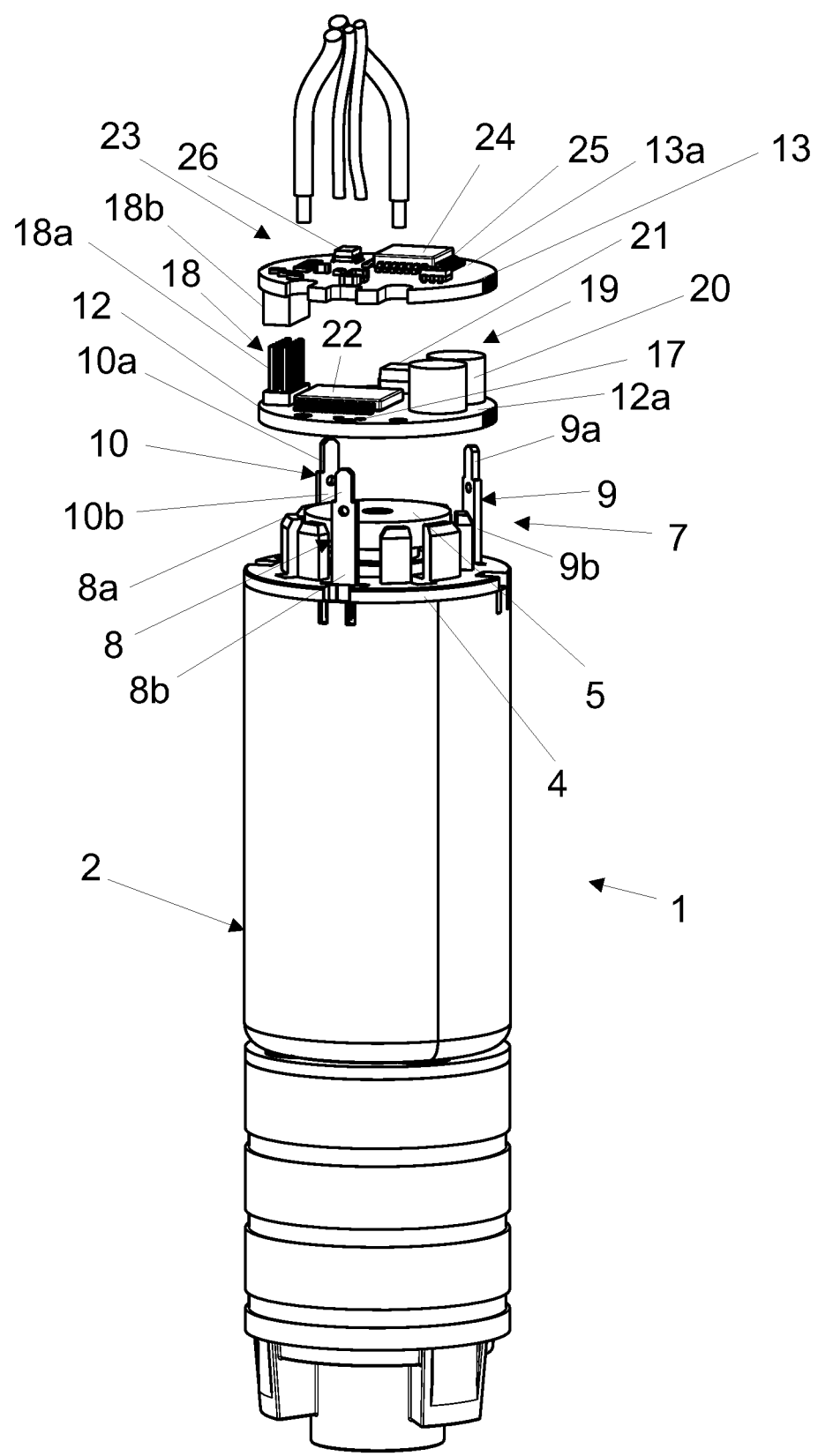
FIG. 2 shows the drive unit from FIG. 1 in a partial exploded view.

FIG. 2 shows the drive unit 1 from FIG. 1 in a partial exploded view. In this view it can be seen that the connection device 7 comprises a first conductive contact pin 8, a second conductive contact pin 9 and a third conductive contact pin 10, which are guided perpendicularly through the cover element 4. The contact pins 8, 9, 10 each have at their upper ends tapered contact sections 8*a*, 9*a*, 10*a*, which are adjacent to wider center sections 8*b*, 9*b*, 10*b*. Advantageously, the contact pins 8, 9, 10 can thus be inserted easily into contact bores 17 provided on the first printed circuit board 12. The contact bores 17 have an elongated shape corresponding to the cross-section of the contact pins 8, 9, 10 in the contact sections 8*a*, 9*a*, 10*a*.

The contact bores 17 have a smaller width than the center sections 8*b*, 9*b*, 10*b*, adjoining the tapered contact sections 8*a*, 9*a*, 10*a*, of the contact pins 8, 9, 10. Thus, the first printed circuit board 12 can be supported on the respective center sections 8*b*, 9*b*, 10*b* if the first printed circuit board 12 is plugged into the contact pins 8, 9, 10. It is, advantageously, ensured in this manner that the first printed circuit board 12 is arranged at a defined distance above the rotatable ring magnet 5, and, at the same time, an electrical connection exists between the first printed circuit board 12 and the motor 2.

The first printed circuit board 12 can be electrically connected to the second printed circuit board 13 via a plug connector 18. The plug connectors 18 comprise a contact pin strip 18*a*, which is arranged on the top side 12*a* of the first printed circuit board 12, and a contact socket 18*b* arranged on the underside of the second printed circuit board 13 for establishing an electrical connection between the first printed circuit board 12 and the second printed circuit board 13. The mounting of the control device 11 is advantageously realized in an uncomplicated manner by plugging together the two printed circuit boards 12, 13 via the plug connector 18. Further advantageously, the plug connector 18 simultaneously functions as a spacer between the first printed circuit board 12 and the second printed circuit board 13.

A power unit 19 is arranged on the first printed circuit board 12. The power unit 19 comprises a filter 20, a Hall sensor 21 and a motor driver 22. A control unit 23 is arranged on the second printed circuit board 13. The control unit comprises a microcontroller 24, a vehicle-bus transceiver 25 and a voltage regulator 26, all of which are arranged on the top side 13*a* of the second printed circuit board.

Figure 3:
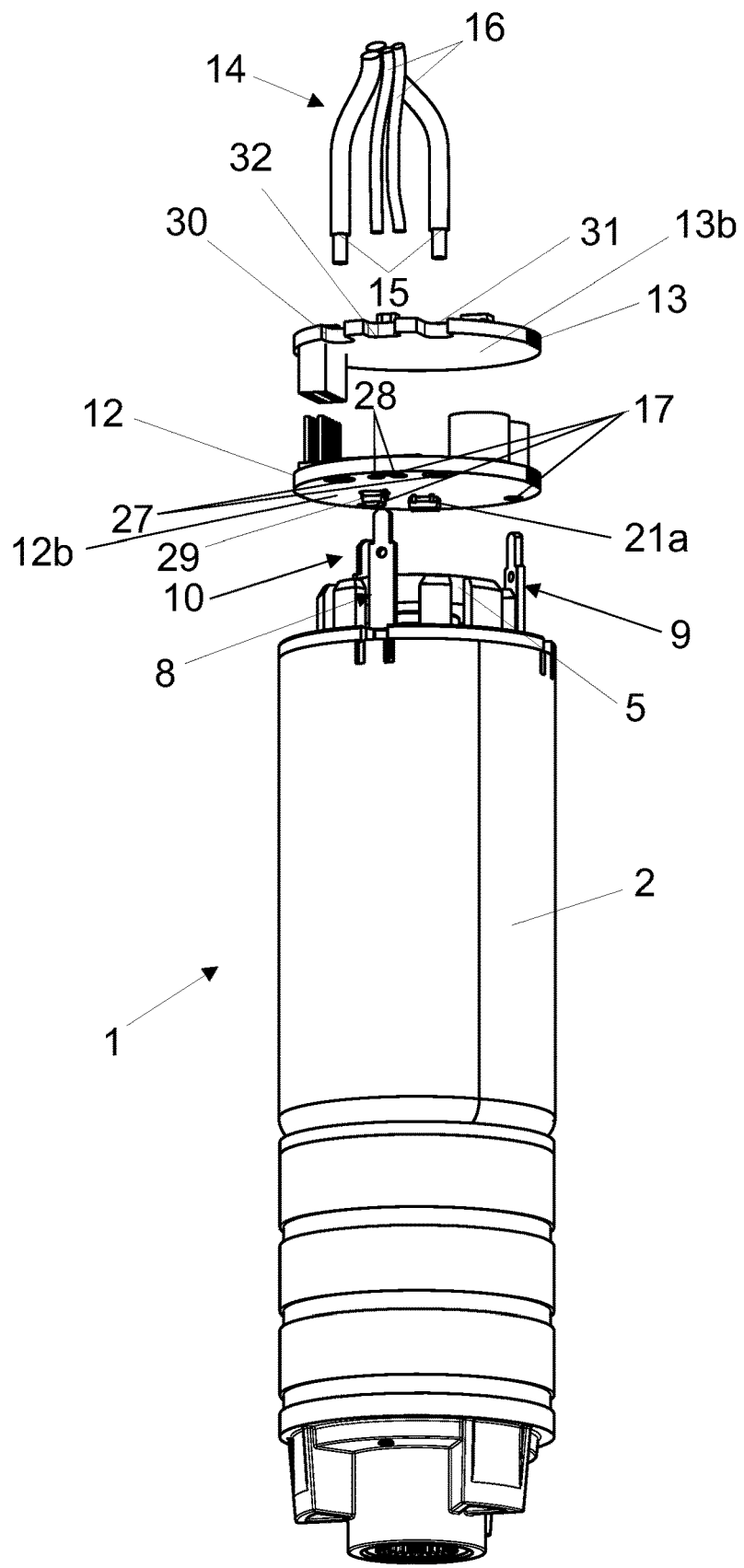
FIG. 3 shows the drive unit from FIG. 2 from a modified viewing angle.

FIG. 3 shows the drive unit 1 from FIG. 2 from a modified view angle, in which an underside 12*b* of the first printed circuit board 12 and an underside 13*b* of the second printed circuit board 13 can be seen. In this view it can be seen, that a measuring probe 21*a* of the Hall sensor is arranged on the underside 12*b* of the first printed circuit board 12, so that it is expediently positioned at a small distance from the ring magnet 5 in order to achieve the measurement accuracy required for the measurement of the motor rotational speed of the motor 2. Furthermore, the contact bore 17 provided for the insertion of the contact pins 8, 9, 10 is arranged on the underside 12*b* of the first printed circuit board 12. Furthermore, a polarity reverse protection device 29 is arranged on the underside 12*b* of the first printed circuit board 12. In the exemplary embodiment shown here, the polarity reverse protection device 29 is designed as an electrical polarity reverse protection device.

Advantageously, the protection of the components installed in the drive unit when a voltage is applied in the wrong polarity is ensured in any case, particularly in the event that a mechanical polarity reverse protection device is not provided or at least fails.

The first printed circuit board 12 further has two first round holes 27, which are provided for connection to the pair of power supply cables 15. Furthermore the first printed circuit board 12 has two second round holes 28 arranged between the two first round holes 27 and provided for connection to the pair of control line cables 16. In the exemplary embodiment shown here, the diameter of the first round holes 27 is larger than the diameter of the second round holes 28, since the diameter of the pair of power supply cables 15 is larger than the diameter of the pair of control line cables 16.

The second printed circuit board 13 has a round basic shape. In an edge region the second printed circuit board 13 has a first recess 30 and a second recess 31, which are provided for the passage of the pair of power supply cables 15. Furthermore, the second printed circuit board 13 has a third recess 32, which is provided for the passage of the pair of control line cables 16. The third recess 32 is arranged between the first recess 30 and the second recess 31. Advantageously, the entire outer diameter of the drive unit 1 is left unmodified by the cable harness 14, so that the drive unit 1 is designed to save space. The first recess 30 and the second recess 31 are advantageously arranged above the first round holes 27 and the third recess 32 is arranged above the second round holes 28, so that the power supply cables 15 and the control line cables 16 are not mechanically bent if they are inserted from above into the first round holes 27 or second round holes 28.

The present disclosure has been explained above with reference to an exemplary embodiment, in which the control device 11 is arranged to be open at the upper end 3a of the housing 3. It is understood that the control device 11 can comprise a control housing, which surrounds the control device 11 for the purpose of electromagnetic shielding or also mechanical protection.

What is claimed is:

1. A drive unit for a vehicle flap drive, comprising
   a housing;
   a motor arranged in the housing;
   a control device configured for control of the motor, the control device comprising a first printed circuit board having a top side and an underside, and a second printed circuit board having a top side and an underside, the first printed circuit board being arranged above the motor, and the second printed circuit board being arranged above the first printed circuit board;
   a power unit arranged on the first printed circuit board, the power unit comprising at least one first filter and a Hall sensor;
   a control unit arranged on the second printed circuit board, the control unit comprising at least one microcontroller and a voltage regulator; and
   at least one polarity reverse protection device arranged on the underside of the first printed circuit board,
   wherein the second printed circuit board, in an edge region, has a first recess and a second recess for the passage of a pair of power supply cables.

2. The drive unit according to claim 1, wherein the control unit comprises a vehicle-bus transceiver.

3. The drive unit according to claim 2, wherein the microcontroller, the vehicle-bus transceiver and the voltage regulator are arranged on the top side of the second printed circuit board.

4. The drive unit according to claim 1, wherein the first printed circuit board is connected to the second printed circuit board via a plug connector.

5. The drive unit according to claim 4, wherein the plug connector comprises a contact pin strip and a contact socket.

6. The drive unit according to claim 5, wherein the contact pin strip is arranged on the top side of the first printed circuit board, and the contact socket is arranged on the underside of the second printed circuit board.

7. The drive unit according to claim 5, wherein the contact pin strip is arranged on the underside of the second printed circuit board, and the contact socket is arranged on the top side of the first printed circuit board.

8. The drive unit according to claim 1, wherein a motor driver is arranged on the first printed circuit board.

9. The drive unit according to claim 8, wherein the motor driver is connected on an input side to the microcontroller and on an output side to the motor.

10. The drive unit according to claim 1, wherein the power supply cables are expediently connected to the first printed circuit board or to the power unit arranged on the first printed circuit board.

11. The drive unit according to claim 10, wherein the second printed circuit board has, in the edge region, a third recess for the passage of a pair of control line cables.

12. The drive unit according to claim 11, wherein the first printed circuit board has two first round holes which are provided for electrical connection to the pair of power supply cables.

13. The drive unit according to claim 12, wherein the first printed circuit board has two second round holes which are provided for electrical connection to the pair of control line cables.

14. The drive unit according to claim 13, wherein the two second round holes are arranged between the two first round holes.

15. The drive unit according to claim 14, wherein the first round holes are each arranged below the first recess and the second recess.

16. The drive unit according to claim 15, wherein the two second round holes are arranged below the third recess.

17. The drive unit according to claim 1, wherein the housing comprises at an upper end a cover element that seals the housing upwards.

18. The drive unit according to claim 17, further comprising a connection device arranged at an upper end of the housing in a region of the cover element for electrically connecting the control device to the motor, wherein the connection device comprises a first contact pin, a second contact pin and a third contact pin and.

19. The drive unit according to claim 18, wherein the contact pins pass through the cover element at the upper end of the housing and the contact pins have on their upper ends facing the first printed circuit board tapered contact sections that adjoin underlying, wider center sections and the first printed circuit board has contact bores that match the contact sections and into which the contact pins of the connection device are insertable.

* * * * *